United States Patent [19]

Gibson et al.

[11] Patent Number: 5,283,875
[45] Date of Patent: Feb. 1, 1994

[54] METHOD AND APPARATUS FOR OPTIMIZING PREFETCH CACHING BY REVERSE ORDERING OF LOGICAL BLOCKS

[75] Inventors: Kenneth J. Gibson, Monument; James P. Jackson, Colorado Springs; Richard F. Lary, Colorado Springs; Wayne A. Thorsted, Colorado Springs, all of Colo.

[73] Assignee: Digital Equipment Corporation, Maynard, Mass.

[21] Appl. No.: 509,037

[22] Filed: Apr. 13, 1990

[51] Int. Cl.⁵ .............. G06F 12/00; G06F 12/08; G06F 12/06
[52] U.S. Cl. .................. 395/400; 395/425; 364/DIG. 1
[58] Field of Search .................. 395/400, 425

[56] References Cited

U.S. PATENT DOCUMENTS

| | | | |
|---|---|---|---|
| 4,384,342 | 5/1983 | Imura et al. | 364/900 |
| 4,400,793 | 8/1983 | Schuenemann | 364/900 |
| 4,727,439 | 2/1988 | Haruna et al. | 360/49 |
| 4,800,483 | 1/1989 | Yamamoto et al. | 364/200 |
| 4,835,686 | 5/1989 | Furuya et al. | 364/200 |
| 5,018,095 | 5/1991 | Nissimov | 395/400 |
| 5,088,031 | 2/1992 | Takasaki et al. | 395/400 |
| 5,113,512 | 5/1992 | Miki et al. | 395/425 |

FOREIGN PATENT DOCUMENTS 0120330 2/1984 European Pat. Off. .
0080878 11/1992 European Pat. Off. .

OTHER PUBLICATIONS 100-mm Winchester Disks Broaden Integrator's Choices, Electronic Design, vol. 30, No. 19, Sep. 1982, Hasbrouck Heights, N.J.

*Primary Examiner*—Joseph L. Dixon
*Assistant Examiner*—Michael A. Whitfield
*Attorney, Agent, or Firm*—Arnold, White & Durkee

[57] ABSTRACT

Methods and apparatus for optimizing prefetch caching for sets of disc drives with reverse ordered logical block mapping.

16 Claims, 4 Drawing Sheets

METHOD AND APPARATUS FOR OPTIMIZING PREFETCH CACHING BY REVERSE ORDERING OF LOGICAL BLOCKS

FIELD OF THE INVENTION

The present invention relates to logical block mapping of logical data blocks on disc type data storage systems, and more particularly to methods and apparatus for logical block to physical sector mapping and access to optimize prefetch caching with disc type data storage systems.

BACKGROUND OF THE INVENTION

Modern data processing systems generally use magnetic disc storage systems for storing therein an operating system program and data. Such a disc storage system may comprise an array of disc drives, with each disc drive having a plurality of discs and associated magnetic heads for each of the two magnetic surfaces of each disc.

"Caching" of logical data blocks retrieved from the disc drive array is often done to improve the average access time of the disc drive array to requests for logical data blocks from the host data processing system. Caching is a technique that puts a small, fast memory, called a cache memory, in front of a large, slow memory, such as the disc drive array, in such a way that the resulting combination approximates a large, fast memory.

"Prefetch blocks" are the logical data blocks that the host system has not requested, but are read from the discs in the array into the cache memory because a high probability exists that the host will request them in the near future. In this way, the stored prefetch blocks are available from the cache memory in response to a subsequent request from the host without reaccessing the disc drive array.

Logical block numbers (LBN's) provide a means for the host system to address physical data on the disc drives without having to be concerned with the physical attributes of the disc drives. The logical data blocks are stored in the disc drive address with a physical block location that is mapped to correspond to a drive, band, cylinder, sector address in the array. A cylinder is made up of all of the tracks that can be accessed in the array without the need for a seek. For instance, if the disc drive array has five discs so that the array can access ten disc surfaces, it will typically have ten heads. The ten tracks that align beneath those heads at one time make up a cylinder.

A read operation can be viewed as a three step process. The first step is to perform a "seek" operation to move the heads to the correct cylinder. The second step is to wait for the disk to rotate around so that the requested LBN passes under the head. This time is termed "rotational latency." The final step is to read the requested LBN as it passes under the head. Because of the sequential way that user processes for the host system access many files, and the policies that operating systems in the data processing systems use to allocate files, there is a tendency for the disc drive array to first see a request for a set of logical data blocks and then shortly after see a request for another set of logical data blocks starting with the block whose LBN is one greater than the last LBN of the first requested set of logical blocks.

To best utilize the capabilities of the cache memory, it is therefore important to prefetch the logical blocks whose LBNs are greater (by a small amount) than the last logical blocks retrieved by a current request from the host. Traditional block ordering schemes order the LBN's so as to pass under the head in increasing order. When combined with read-ahead caching, these strategies require the heads to stay locked on the cylinder after the desired logical blocks have been read in order to access the read-ahead blocks. This is time that could otherwise be used to begin satisfying subsequent requests.

SUMMARY OF THE INVENTION

The present invention overcomes the above-described limitation of the prior art block ordering scheme by placing the logical blocks on the tracks of the discs in the array in reverse order so that the logical blocks that have a high probability of being read in the near future can be read into cache memory during the otherwise "wasted" rotational latentcy period. The present invention also further increases performance by combining reverse ordered blocks with banding, striping, and compensation for sequential accesses across head switches.

DETAILED DESCRIPTION OF THE INVENTION

The present invention optimizes prefetch caching efficiency of disc drive type storage systems by reverse ordering the LBN's when they are stored on the disc surfaces and between discs so that LBN's that immediately follow the number of a requested LBN are automatically stored in the disc drive cache memory during the rotational latency period. During the rotational latency period, a number of LBN's are read before the requested LBN is found. With the reverse ordering scheme, the LBN's that are read before the requested LBN is found are those LBN's that immediately follow the requested LBN in number. By storing these LBN's in the disc drive cache as they are read, these LBN's are then available from the cache for subsequent LBN requests without performing another read operation.

Figure 1:
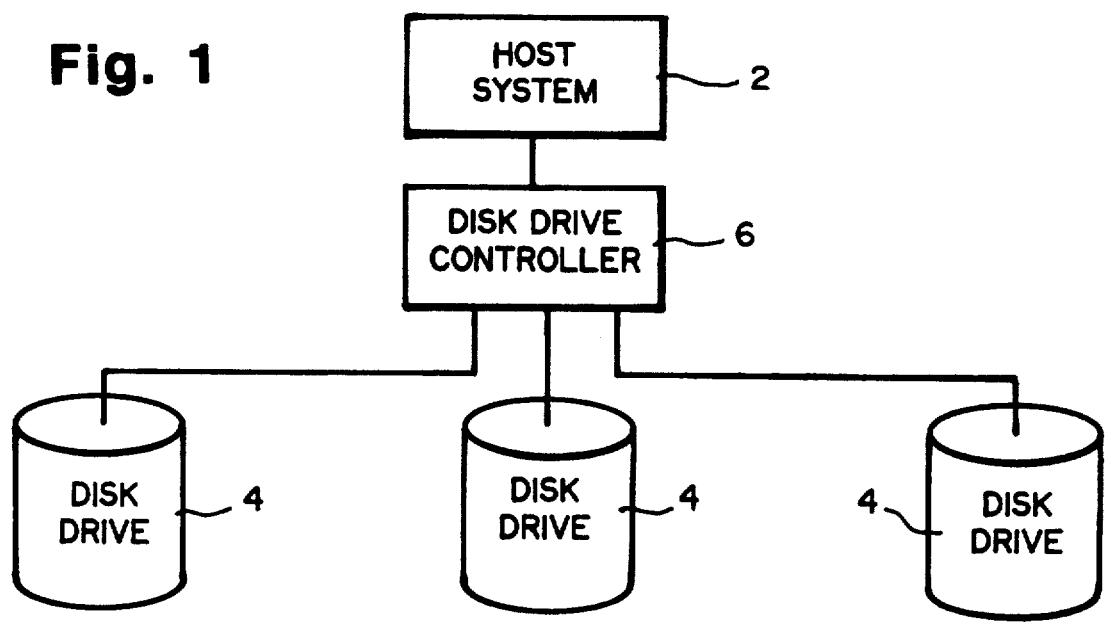
FIG. 1 is a block diagram of a typical data processing system with a plurality of magnetic disc drives suitable for incorporating the present invention.

Referring to the drawings, wherein like characters designate like or corresponding parts throughout the views, FIG. 1 shows a block diagram of a typical host data processing system 2 that includes a plurality of magnetic disc drives 4. The disc drives 4 are coupled to the host system 2 via a disc drive controller 6. The host 2 and the controller 6 are shown only in block form in FIG. 1 because they are well known components of data processing systems that do not themselves constitute the present invention.

Figure 2:
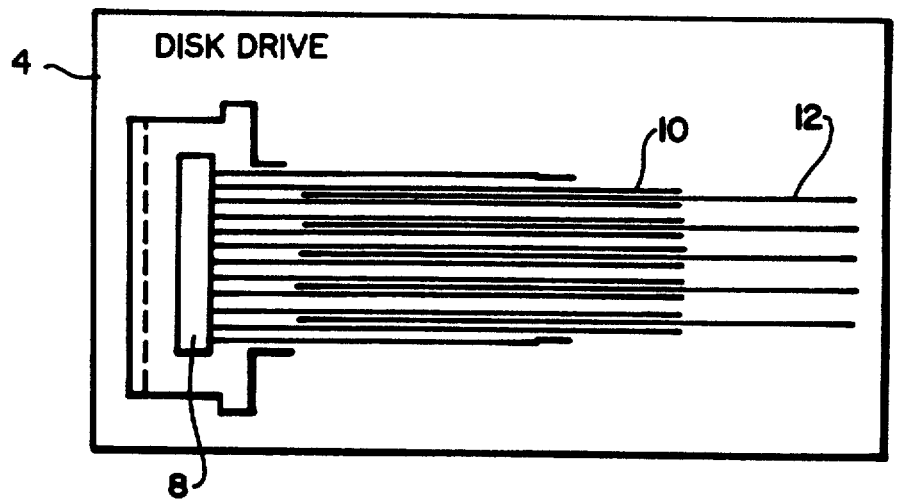
FIG. 2 is a disc drive for the data processing system shown in FIG. 1.

Each of the disc drives 4 have the basic elements shown in detail in FIG. 2. Normally, each of the disc drives 4 respond to a LBN requested by the host 2 via the controller 6 so as to cause an actuator arm 8 in the disc drive 4 to move a set of magnetic heads 10 relative to a corresponding set of magnetic discs 12 to a physical cylinder position corresponding to the cylinder address mapped from the LBN. The disc drive 4 in FIG. 2 is shown with a set of 10 of the magnetic heads 10 and a corresponding set of 5 of the discs 12, although a greater or lesser number of the heads 10 can be used with a corresponding greater or lesser number of the discs 12, as well known in the art.

The disc drives 4 may utilize banding to improve their LBN storage density. The bands comprise different annular areas of the surfaces of the discs 12 that are each written with a different bit frequency that is proportional to the surface velocities of the respective band to maximize the storage density of the disc drive 4. This is because the discs 12 rotate with a constant angular velocity and can support a constant bit density, so that a track with a large radius can support a higher bit frequency than a track with a small radius.

When a system contains a plurality of the disc drives 4, it can be advantageous to "stripe" input/output (I/O) requests. Striping is the dispersion of a single I/O request across multiple disc drives of a disc drive storage system. A "stripe set" consists of two or more disc drives in a disc drive system, with the entire set being presented as a single logical volume for I/O.

The present invention uses striping primarily to statistically balance the I/O request load among the plurality of discs 12 being striped, rather than leave such load balancing to higher-level system components, or manual management techniques. The logical blocks that are presented for I/O are spread across the disc in "chunks". These chunks have a size that may be measured in number of sectors, tracks, cylinders, bands, or even drives. For example, if the chunk size is 10 tracks, then tracks 0 through 9 are on a first one of the disc drives 4, tracks 10 through 19 are on a second, and so forth.

Such banding and striping of the disc drives 4 presents special problems to reverse ordering the way the LBN's are stored on the discs drives 4 so that the LBN's are retrieved with optimal prefetch caching. The striping of I/O requests is problematical for stripe chunk sizes that are not evenly divisible into the number of cylinders in the bands. For instance, if the disc drives 4 each have a band with 3 cylinders and a stripe chunk size of 2 cylinders, then only one stripe chunk fits into the band with one cylinder remaining unassigned to a stripe.

According to the present invention, "short stripes" are the partial chunks left over at the end of a band when the stripe chunk size does not divide evenly into the number of cylinders in the band. Such short stripes allow the I/O requests to be switched between bands and the disc drives 4 when the bands are exhausted before a whole stripe chunk size has been filled. For instance, in the above described example of the discs drives 4 having a band with 3 cylinders and a stripe chunk size of two cylinders, the remaining cylinder is used as a short stripe and the striping procedure is modified to integrate the short stripes with the other stripes on the bands of the disc drives 4. The short stripes allow each of the disc drives 4 to handle the optimum stripe chunk size without the complication of stripe chunks that cross band borders.

To assist in the reverse ordering of the logical blocks between the different disc drives 4 including striping of the bands and short stripes, media block numbers (MBN's) are used. According to the present invention, the media block numbers (MBN's) are numbers that are used to map the LBN's to physical sectors on the disc surfaces in the disc drive array. MBN's map to sectors of the disc drives 4 in a stripe set the way that LBN's normally map to sectors in an unstriped disc drive 4.

The MBN's identify the physical block location of the sectors for each of the disc drives independently of the stripe set used. This allows the drive to be logically addressed without concern as to whether it is in a striped or unstriped configuration. Mapping a LBN to a sector on a striped set of disc drives involves first determining which drive it is, then determining the MBN on that drive, and finally mapping from the MBN to the sector. The MBN's allow each of the disc drives 4 in the stripe set to be treated as an unstriped drive, thus removing the burden of handling striping at the drive level.

If an unstriped set of the disc drives 4 is used, the LBN's can be directly assigned to the disc drives in reverse order, mapped one-to-one with the MBN's. The disc drive controller 6 maps the LBN's to sectors on respective tracks such that there is a one-to-one correspondence. For instance, if a particular track has 8 sectors, LBN 8 is assigned to Sector 1, and each consecutively decreasing LBN is assigned to a consecutively increasing sector until LBN 1 is assigned to Sector 8.

In this way, physical sectors on the track are written in normal order, but logically they are in reverse order, such that the first sector after the track index is Sector 0, assigned with LBN 8. When a seek operation is performed on the track to retrieve LBN 4 on Sector 6 and reading begins at Sector 3 with LBN 7, for instance, then the LBN's read from Sector 3 up to Sector 6, LBN 7, LBN 6, and LBN 5, may be stored in the prefetch cache of the associated disc drive 4. These LBN's may then be retrieved from the prefetch cache if they are sought on subsequent requests.

According to the present invention, the arrangement of the LBN's may be selected to place the highest LBN's in the tracks for the lowest or the highest heads 10 of the disc drives 4. In the embodiment of the present invention described herein, the LBN's are arranged so that the highest LBN's are in the tracks for the highest heads 10 of the disc drives 4. This arrangement allows the most efficient access to the reverse ordered LBN's.

However, between the different tracks for each cylinder it is also necessary to arrange the LBN's so that head switch offset is compensated for when the LBN's are retrieved with the reverse ordering scheme. Otherwise, the LBN's that immediately follow the last LBN in reverse order after track switching cannot be retrieved until a subsequent disc revolution.

If a striped set of the disc drives 4 is used, the MBN's are assigned to the sectors of each track of each cylinder of each of the disc drives 4. The MBN's are assigned to each of the sectors with a one-to-one correspondence, and with the MBN's of each of the disc drives 4 having the same arrangement. In this way, the MBN's map the same sectors of the same tracks of the same cylinders for each of the disc drives 4.

Figure 3:
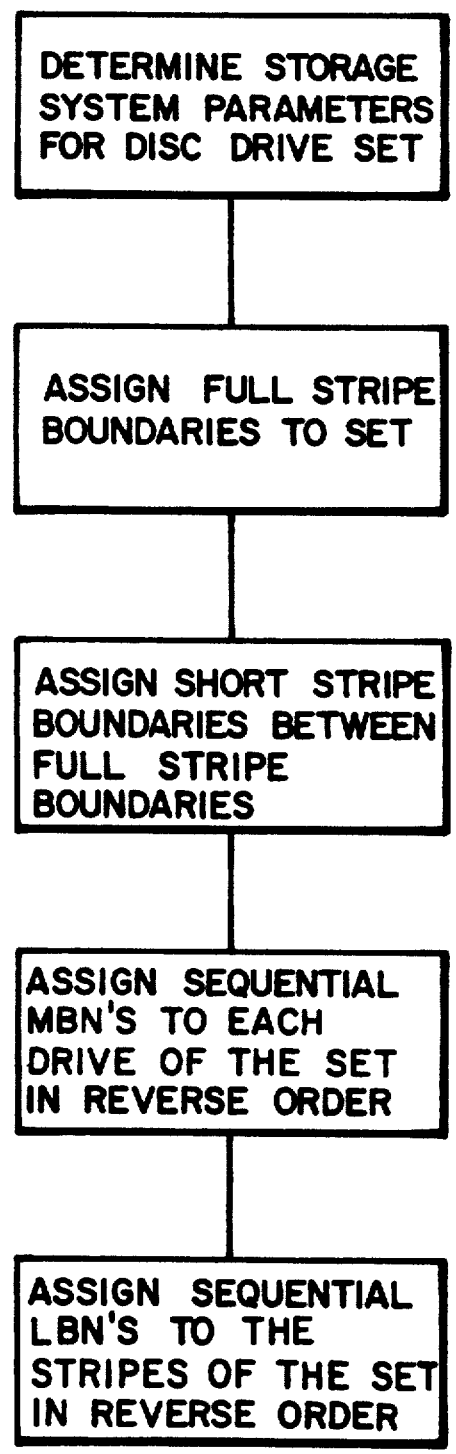
FIG. 3 is a flow chart of the methodology of the logical block mapping according to the present invention for a striped set of three disc drives.

FIG. 3 is a flow chart of the methodology of the LBN and MBN assignment process with striping according to the present invention. The parameters of the striped set of the disc drives 4 are first determined. These parameters include the number of the disc drives 4 in the set, the number of bands per drive, the number of cylinders per band for each band, the number of tracks per cylinder, and the stripe chunk size. In this embodiment, the stripe chunk size is shown by number of tracks.

The boundaries of the full stripes are then determined without crossing band boundaries. According to the present invention, the ordering of the stripes is not important. In the embodiment described herein, the full stripe boundaries are assigned starting from the lowest track in the outer cylinder of the outermost band and terminating at the highest track of the inner cylinder of the innermost band. Those tracks of cylinders at the end of each band that are too small in number to fit into a full stripe are not assigned to a full stripe.

The boundaries of short stripes are then determined without crossing band boundaries. The short stripe boundaries are assigned to the tracks of the cylinders between the assigned full stripes in the same order of assignment as the full stripes.

MBN's are then sequentially assigned in reverse order on each of the disc drives 4 in the striped set from the top track of the outer cylinder of the outermost band to the bottom track of the innermost cylinder of the innermost band. The assignment of the MBN's is confined to each disc drive. In this way, each of the disc drives in the set have the same range and placement of MBN's.

LBN's are then assigned to consecutive "chunks" of MBN's across the disc drives. For example, if each chunk contains 14 MBN's, LBN's 0 to 13 are assigned to MBN's 0 to 13 on the first one of the disc drives 4 in the striped set, LBN's 14 to 27 are assigned to MBN's 0 to 13 on the second one of the disc drives 4 in the striped set, and so forth.

Table 1, as set forth in the appendix attached hereto shows the parameters determined for a striped set of three of the disc drives 4. These parameters include a stripe chunk size of two tracks, three tracks per cylinder, and four bands. The number of LBN's and MBN's per track, the number of sectors per track, the sector offset, the number of cylinders per band and the number of LBN's or MBN's per band are also listed.

Figure 4:
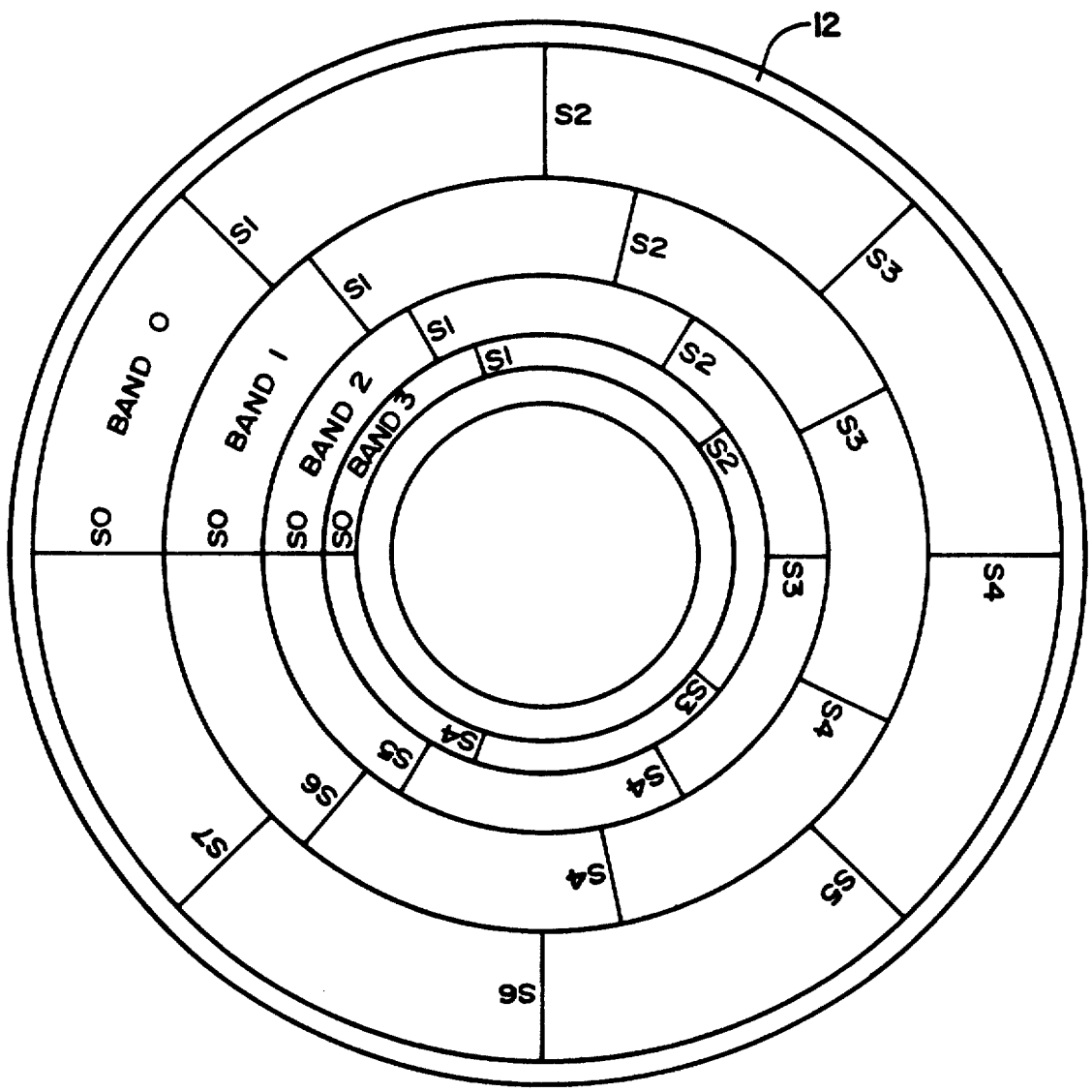
FIG. 4 is a schematic diagram of a banded disc surface configuration according to the prior art for which logical data blocks are arranged according to the present invention.

FIG. 4 shows the band and sector configuration for the surface of each of the discs 12 in the disc drives 4 having the parameters listed in Table 1. The disc 12 is shown with 4 bands on its surface, with each of the bands divided into a different number of sectors conforming to the different storage density of each band. The outermost band of the disc 12 shown in FIG. 4 is "Band 0". Band 0 has 8 sectors per track in each of its 4 cylinders. The band inwardly adjacent Band 0 is "Band 1". Band 1 has 7 sectors per track in each of its 3 cylinders. The band inwardly adjacent Band 1 is "Band 2". Band 2 has 6 sectors per track in each of its two cylinders. The band inwardly adjacent Band 2 is "Band 3". Band 3 has 5 sectors on its single cylinder. All bands have 3 tracks per cylinder. The configuration of the disc 12 shown in FIG. 4 is according to the prior art and it is not itself part of the present invention.

Table 2 as set froth in appendix attached hereto shows the arrangement of MBN's and LBN's suitable for a striped set of three of the disc drives 4 according to the parameters listed in Table 1. Each of the disc drives 4 have four bands on each of the discs 12, three of the heads 10 are used for storing data, and each of the disc drives 4 store 180 of the LBN's so that the striped set of three stores 540 of the LBN's.

In addition, Table 2 is based upon a stripe chunk size of 2 tracks across all the bands. "Band 0", The outermost band with the greatest storage density, is arranged to have 8 sectors per track and 4 cylinders. With one sector "reserved" on each track for a replacement block number (RBN), 7 of the LBN's are thus assignable per track on Band 0.

Since there are three tracks per cylinder for each of the disc drives 4, there are 84 sectors in Band 0 that are assignable to LBN's and MBN's for each of the disc drives 4, allowing 252 sectors in Band 0 that are assignable to LBN's and MBN's for the entire striped set. Table 1 also provides for a sector offset of 4 sectors on Band 0 to account for head switch offset within Band 0. The sector offset is arranged for the reverse ordering of the LBN's.

"Band 1", the band inwardly adjacent to Band 0, has less storage density than Band 0. It is arranged to have three cylinders with 7 sectors per track. One of the sectors per track is reserved for an RBN, so six sectors per track are available for assignment to LBN's and MBN's in Band 1. Since each cylinder has three tracks, 54 of the sectors in Band 1 are assignable to LBN's and MBN's for each of the disc drives 4, allowing 162 sectors in Band 1 that are assignable to LBN's and MBN's for the entire striped set. Table 2 also provides for a sector offset of 3 sectors on Band 1 to account for head switch offset within Band 1.

"Band 2", the band inwardly adjacent to Band 1, has less storage density than Band 1. It is arranged to have 2 cylinders with six sectors per track. One of the sectors per track is reserved for an RBN, so five sectors per track are available for assignment to LBN's and MBN's in Band 2. Since each cylinder has three tracks, 30 of the sectors in Band 2 are assignable to LBN's and MBN's for each of the disc drives 4, allowing 90 sectors in Band 2 that are assignable to LBN's and MBN's for the entire striped set. Table 1 also indicates a sector offset of 2 sectors on Band 2 to account for head switch offset within Band 2.

"Band 3", the innermost band, has less storage density than any of the others. It is arranged to have only one cylinder in its band with five sectors per track. One of the sectors per track is reserved for an RBN, so four sectors per track are available for assignment to LBN's and MBN's in Band 3. Since the cylinder for Band 3 has three tracks, 12 of the sectors in Band 3 are assignable to LBN's and MBN's for each of the disc drives 4, allowing 36 sectors in Band 3 that are assignable to LBN's and MBN's for the entire striped set. Table 1 also indicates a sector offset of one sector on Band 3 to account for head switch offset within Band 3.

The MBN's are assigned in one-on-one correspondence with the sectors in reverse order starting with the single cylinder, cylinder 0, and head 2, the highest of the heads 10, for each of the disc drives 4 listed in Table 1. Since each of the disc drives 4 arranged in this configuration store 180 of the MBN's, ranging from MBN 0 to MBN 179, MBN 179 is assigned to Sector 0 of Track 2 in the Cylinder 0 of Band 3. Track 2 corresponds to the highest head 10 of the Drive 2 in Table 1. Likewise, Track 1 corresponds to the head 10 of the Drive 2 immediately below Track 2, and Track 0 corresponds to the lowest head 10 of the Drive 2 immediately below Track 1.

Since Track 2 of Cylinder 0 of Band 3 has 5 sectors, 4 of the sectors are available for storage of MBN's and one sector for an RBN. Therefore, MBN 179 through MBN 176 are stored in Sector 0 through Sector 3 respectively, and the RBN for this track is assigned to the immediately following Sector 4.

Band 3 has an offset of one sector between tracks, so that MBN 175 is assigned to the sector in Track 1 following the one immediately after Sector 3 in Track 2 that stores MBN 176. Thus, Sector 0 through Sector 3 of Track 1 in Cylinder 0 of Band 3 are assigned with MBN 175 through MBN 172 respectively, with an RBN assigned to Sector 4. Likewise, Sector 0 through Sector 3 of Track 0 in Cylinder 0 of Band 3 are assigned with MBN 171 through MBN 168 respectively, with an RBN assigned to Sector 4.

It should be noted that the RBN's For Tracks 2, 1 and 0 are conveniently positioned on the sectors within the offset of the sectors assigned to the MBN's so that no increased access time occurs due to inclusion of the RBN's. Likewise, the RBN's are also arranged this way on the other bands as well.

The MBN's are continued on Band 2 of Drive 2 starting with the inner cylinder, Cylinder 1, on Track 2. It should be noted that head switch offset is not defined between cylinders, either of the same or different bands. This is because a seek operation is always involved for the heads 10 that interrupts the track switching operation. Because of the period of the seek operation and its variability, any assignment of sector offset due to the seek operation between cylinders is a rough approximation at best.

However, such sector offsets may be used for seeks to improve spiral transfers comprising large numbers of sequential LBN's at one time. The use of sector offsets is a design decision, and not part of the present invention. The embodiment of the present invention herein described does not use sector offsets for the seeking operation although it is within the scope of the present invention to do so.

Since MBN 167 continues on a different cylinder, a seeking operation is involved. Therefore, because a sector offset for the seeking operation is not used for this embodiment, MBN 167 is arbitrarily assigned to Sector 0 of Band 2. Thus, MBN 167 through MBN 163 are assigned to Sector 0 through 4 respectively, and an RBN is assigned to Sector 5.

Because of the two sector offset between Track 2 and Track 1 in Band 2, MBN 162 is assigned to Sector 1 of Track 1 in Cylinder 1 of Band 2. In this way MBN 162 through MBN 158 are assigned to Sector 1 through Sector 5 respectively, with an RBN assigned to Sector 0. Because of the two sector offset, MBN 157 is assigned to Sector 2 of Track 0 in Cylinder 1 of Band 2. MBN 157 through MBN 153 are thus assigned to Sector 2 through Sector 5 and then Sector 0 respectively, and an RBN is assigned to Sector 1.

MBN 152 is arbitrarily assigned to Sector 0 of Track 2 in Cylinder 0 of Band 2, since a seek operation between cylinders occurs and the two sector offset in Band 2 thus does not apply. MBN 152 through 148 are thus assigned to Sector 0 through Sector 4, and an RBN is assigned to Sector 5. Because of the two sector offset between Track 2 and Track 1 in Band 2, MBN 147 is assigned to Sector 1 of Track 1 in Cylinder 0 of Band 2. In this way MBN 147 through MBN 143 is assigned to Sector 1 through Sector 5, with an RBN assigned to Sector 0.

Similarly, MBN 142 is assigned to Sector 2 of Track 0 in Cylinder 0 to account for the two sector offset in Band 2 between Track 1 and Track 0. MBN 142 through MBN 138 are thus assigned to Sector 2 through Sector 5 and Sector 0, respectively, with an RBN assigned to Sector 1.

Assignment of the MBN's from band to band, cylinder to cylinder and track to track continues in this way until MBN 0 is assigned to Sector 4 in Track 0 of Cylinder 0 of Band 0 according to Table 1. As explained above, whenever the assignment of the MBN's switches from Track 0 of one cylinder to Track 2 of another, assignment of the MBN's with a sector offset does not apply. In this case, the assignment of the MBN's is arbitrarily established to continue with Sector 0 of Track 2 in the following cylinder, just as described above.

The other disc drives 4 listed as Drive 1 and Drive 0 in Table 2 have their MBN's assigned the same way, so that their MBN's are all assigned to the same respective sectors as Drive 2. If the disc drives 4 listed in Table 2 are arranged in an unstriped set, then the corresponding LBN's can be assigned on a one-on-one basis with the MBN's, so that LBN 539 is assigned to the same sector of the same track in the same cylinder of the same band as MBN 179 on Drive 2. In this case, LBN 539 is assigned to the same sector of the same track in the same cylinder of the same band as MBN 179 in Drive 1 and LBN 179 is assigned to the same sector of the same track in the same cylinder of the same band as MBN 179 in Drive 0.

However, arrangement of the LBN's shown in Table 2 for the disc drives 4 listed as Drive 2, Drive 1 and Drive 0 is for a striped set of the drives with a stripe chunk size of two tracks. As with an unstriped set, the LBN's are arranged with LBN 539 assigned to the same sector of the same track in the same cylinder of the same band as MBN 179 in Drive 2. Since MBN 179 is assigned to Sector 0 of Track 2 in Cylinder 0 of Band 3, this MBN is assigned in a "short stripe" of Cylinder 0.

This is because the stripe chunk size is two tracks, and Band three only has three tracks. As arranged in Table 2, one stripe extends from Track 0 through Track 1 of Cylinder 0 in Band 3. Therefore, Track 2 of Cylinder in Band 3 is a short stripe of only one track, since Band 3 only has one cylinder and stripes cannot extend across band boundaries, into Band 2, for instance.

LBN 539 through LBN 536 are thus consecutively assigned to Sector 0 through Sector 3 in Track 2 of Cylinder 0 in Band 3 of Drive 2, and an RBN is assigned to Sector 4. Because this track in Band 3 is a short stripe, LBN 535 is assigned to the sector in the track of the cylinder of the band in Drive 1 corresponding to MBN 179. LBN 535 through LBN 532 are thus consecutively assigned to Sector 0 through Sector 3 of Track 2 in Cylinder 0 of Band 3 in Drive 1, and an RBN is assigned to Sector 4.

Since Track 2 of Cylinder 0 of Band 3 in Drive 1 is also a short stripe, LBN 531 is assigned to the sector in the track of the cylinder of the band in Drive 0 corresponding to MBN 179. LBN 531 through LBN 528 are thus consecutively assigned to Sector 0 through Sector 3 of Track 2 in Cylinder 0 of Band 3 in Drive 0, and an RBN is assigned to Sector 4.

Since Track 2 of Cylinder 0 of Band 3 in Drive 0 is also a short stripe, LBN 527 is assigned to the next stripe in the set, which is the full stripe in Band 3 starting with Track 1 in Cylinder 0. LBN 527 is arbitrarily assigned to Sector 0 of Track 1 so that LBN 527 through LBN 524 are consecutively assigned to Sector 0 through Sector 3, with an RBN assigned to Sector 4.

Continuing in this full stripe, LBN 523 is assigned to Sector 0 of Track 0 in Cylinder 0 of Band 3 to account for the one sector offset in Band 3. Thus LBN 523 through LBN 520 are consecutively assigned to Sector 0 through Sector 3 of Track 0 in Cylinder 0 of Band 3, with an RBN assigned to Sector 4.

LBN 519 is assigned to the next full stripe, which starts with Track 1 in Cylinder 0 of Band 3 in Drive 1. LBN 519 is arbitrarily assigned to Sector 0 so that LBN 519 through LBN 516 are consecutively assigned to Sector 0 through Sector 3 of Track 1 in Cylinder 0 of Band 3, with an RBN assigned to Sector 4.

Continuing in this full stripe, LBN 515 is assigned to Sector 0 of Track 0 in Cylinder 0 of Band 3 to account for the one sector offset in Band 3. Thus LBN 515 through LBN 512 are consecutively assigned to Sector 0 through Sector 3 of Track 0 in Cylinder 0 of Band 3, with an RBN assigned to Sector 4.

LBN 511 is assigned to the next full stripe, which starts with Track 1 in Cylinder 0 of Band 3 in Drive 0. LBN 511 is arbitrarily assigned to Sector 0 so that LBN 511 through LBN 508 are consecutively assigned to Sector 0 through Sector 3 of Track 1 in Cylinder 0 of Band 3, with an RBN assigned to Sector 4.

Continuing in this full stripe, LBN 507 is assigned to Sector 0 of Track 0 in Cylinder 0 of Band 3 to account for the one sector offset in Band 3. Thus LBN 507 through LBN 504 are consecutively assigned to Sector 0 through Sector 3 of Track 0 in Cylinder 0 of Band 3, with an RBN assigned to Sector 4.

The assignment of LBN 506 through LBN 0 then continues in this way through the stripes sequentially from Drive 2 through Drive on Band 2 through Band 0. Short stripes on Bands 2, 1 and 0 are determined in the same way as the short stripes in Band 3, and are so indicated in Table 1.

Of course, the present invention can be applied to any number of disc drives 4 in a striped set or an unstriped set, with any number of tracks in any number of cylinders in any number of bands. The above-described embodiment represents only a simple implementation of logical block mapping according to the present invention.

Figure 5:
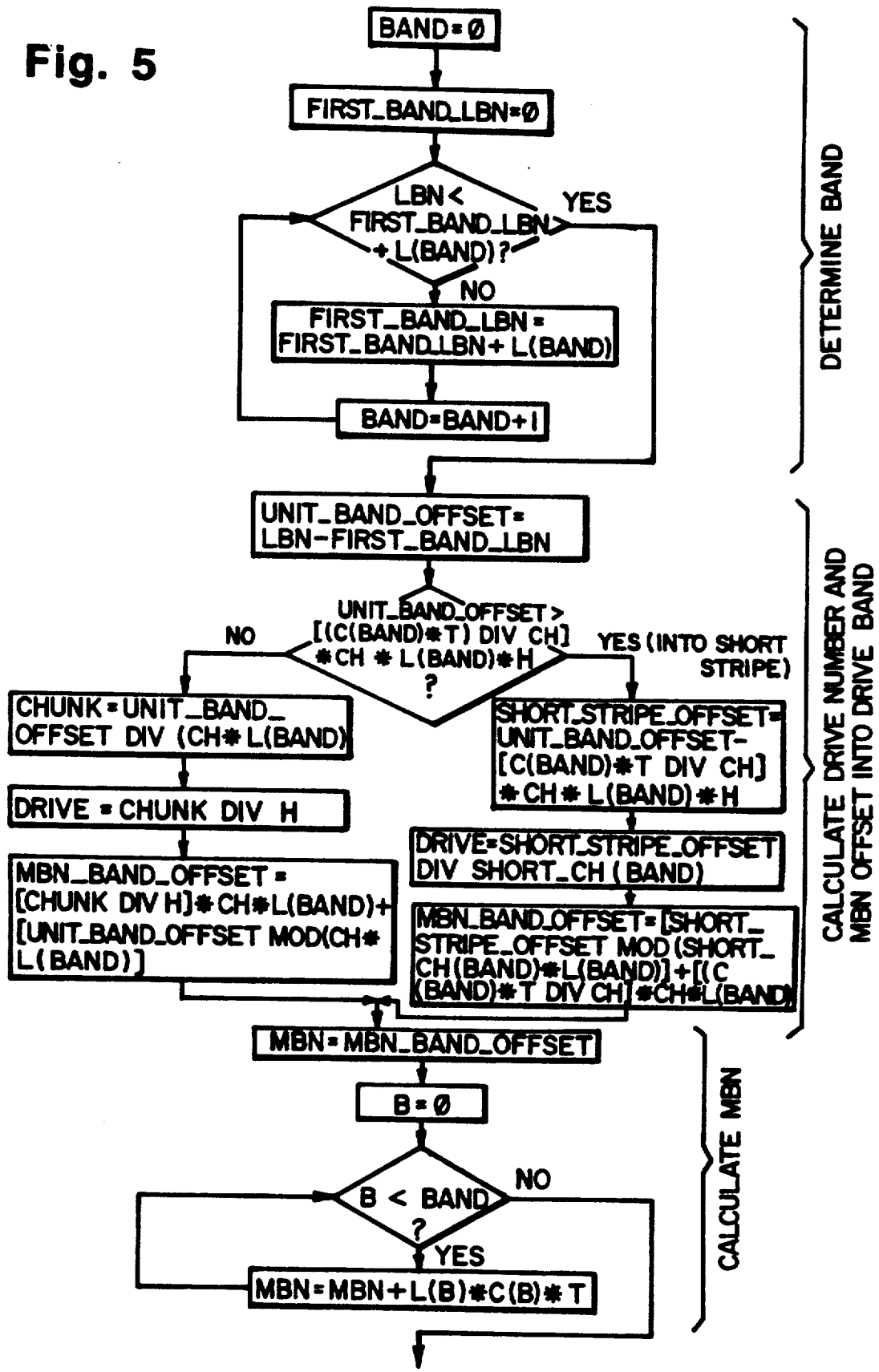
FIG. 5 is a flow chart of a LBN mapping algorithm according to the present invention.

The disc drive controller 6 is easily programmed to implement the present invention for any combination of sets of the disc drives 4, either striped or unstriped. The following code is an example of programming suitable for this purpose in a striped set that functions with any combination of disc drive set size, disc drive storage density, stripe chunk size and number of bands. FIG. 5 is a flow chart of the LBN mapping algorithm according to the present invention implementing this code.

The following generic symbols are used in this code:
b = band number for disc drive
s(b) = sectors per track for band b
t = tracks per cylinder for disc drive
c(b) = cylinders per band for band b
h = number of disc drives in a stripe set
ch = number of tracks in a stripe chunk
l(b) = LBN's per track for band b
o(b) = sector offset per head switch for band b
r = RBN's per track for disc drive
d = disc drive number in a stripe set
short_ch = tracks per chunk in a short stripe DIV = The Pascal integer division operator. The result is not rounded and it is truncated toward zero to the nearest integer.
MOD = The Pascal modulus function. It returns the remainder that results from the DIV operation.

The disc drive controller 6 first calculates the unit band number and the offset into the band with the following code:

```
Cyl_offset(0) = 0
U_LBN_offset(0) = LBN
U_LBN_offset(1) = U_LBN_offset(0) - h * c(o) * t * l(0)
if U_LBN_offset(1) < 0, b = 0, Check for short stripe
Cyl_offset(1) = c(0)
U_LBN_offset(2) = U_LBN_offset(1) - h * c(1) * t * l(1)
if U_LBN_offset(2) < 0, b = 1, Check for short stripe
Cyl_offset(2) = c(0) + c(1)
U_LBN_offset(3) = U_LBN_offset(2) - h * c(2) * t * l(2)
if U_LBN_offset(last_band) < 0, b = 2, Check for
short stripe
  .
  .
     (progression continues until last_band - 1)
Cyl_offset(last_band) = c(0) + c(1) +
c(2) + ... + c(last_band - 1)
b = last_band, Check for short stripe
```

The disc drive controller 6 checks for the short stripe condition and determines the drive number with the following code:

```
if U_LBN_offset(b) > ((c(b) * t) DIV ch) * ch * l(b) * h
(It is in a short stripe chunk)
    short_ch = (c(b) * t) MOD ch
    U_rem_offset = U_LBN_offset - (c(b) * t DIV ch)
        * ch * l(b)
    d = U_rem_offset DIV short_ch
    MBN_offset(b) = (U_rem_offset MOD (short_ch *
        l(b)) + ((c(b) * t) DIV ch) * ch
        * l(b)
else
(It is not a short stripe)
    chunk_number = U_LBN_offset(b) DIV (ch * l(b))
    d = chunk_number MOD h
    MBN_offset(b) = (U_LBN_offset(b) MOD (ch * l(b))
        + (chunk_number DIV h) * ch *
        l(b)
```

The disc drive controller 6 then calculates the MBN with the following code:

```
MBN = MBN_offset(b)
if b > 0 MBN = MBN + l(0) * c(0) * t
if b > 1 MBN = MBN + l(1) * c(1) * t
if b > 2 MBN = MBN + l(2) * c(2) * t
(progression continues until last band number - 1)
```

The disc drive controller 6 then calculates the physical cylinder, track and sector numbers with the following code:

```
Cylinder = MBN_offset(b) DIV (t * l(b))
Track = (MBN_offset(b) DIV l(b)) MOD t
Track_offset = MBN_offset MOD l(b)
Inverted_track_offset = l(b) - 1 - Track_offset
Sector = (Inverted_track_offset + Sector_offset) Mod
    s(b)
```

The code for an unstriped set of the disc drives 4 is the same, except that there are no strips calculations and the LBN's map one-to-one with the MBN's.

With the reverse ordered LBN's arranged as prescribed above, the normal read operation for a requested LBN automatically stores LBN's immediately subsequent the requested LBN during the read latentcy period because these LBN's are read before the requested LBN is found. For instance, in the example described above, if LBN 42 is requested, Track 2 in Cylinder 0 of Band 0 in Drive 0 is read. If the head corresponding to this track lands on the associated disc at Sector 0 of Track 0, Sectors 0 through 6 must be read during the read latency period because LBN 42 is in Sector 6.

Thus there has been described herein methods and apparatus for implementing reverse ordered logical block mapping in disc drive data storage sets to optimize prefetch caching. It will be understood that various changes in the details, arrangements and parts of the systems, as well as the steps of the processes, herein described and illustrated in order to explain the nature of the present invention may be made by those skilled in the art within the principle and scope of the invention as expressed in the appended claims.

APPENDIX

TABLE 1

MINI-DISK
(Striped)

Parameters consistent across the Unit:

Stripe size = 2 tracks
Heads = 3
lbns = 540

Parameters that are the same for all Drives:

| Band 0 | | Band 1 | | Band 2 | | Band 3 | |
|---|---|---|---|---|---|---|---|
| lbns/track = | 7 | lbns/track = | 6 | lbns/track = | 5 | lbns/track = | 4 |
| sectors/track = | 8 | sectors/track = | 7 | sectors/track = | 6 | sectors/track = | 5 |
| sector offset = | 4 | sector offset = | 3 | sector offset = | 2 | sector offset = | 1 |
| cyl band = | 4 | cyl band = | 3 | cyl band = | 2 | cyl band = | 1 |
| lbns = | 252 | lbns = | 162 | lbns = | 90 | lbns = | 36 |

= = = = = = = = = = = = = = = = = track boundry
•••••••••••••••• = stripe chunk boundry

TABLE 2

DRIVE 0

Band 0

| cylinder | track | sector | MBN | LBN |
|---|---|---|---|---|
| 0 | 0 | 0 | 4 | 4 |
|   |   | 1 | 3 | 3 |
|   |   | 2 | 2 | 2 |
|   |   | 3 | 1 | 1 |
|   |   | 4 | 0 | 0 |
|   |   | 5 | rbn | rbn |
|   |   | 6 | 6 | 6 |
|   |   | 7 | 5 | 5 |
| 0 | 1 | 0 | 8 | 8 |
|   |   | 1 | 7 | 7 |
|   |   | 2 | rbn | rbn |
|   |   | 3 | 13 | 13 |
|   |   | 4 | 12 | 12 |
|   |   | 5 | 11 | 11 |
|   |   | 6 | 10 | 10 |
|   |   | 7 | 9 | 9 |
| 1 | 0 | 0 | 20 | 48 |
|   |   | 1 | 19 | 47 |
|   |   | 2 | 18 | 46 |
|   |   | 3 | 17 | 45 |
|   |   | 4 | 16 | 44 |
|   |   | 5 | 15 | 43 |
|   |   | 6 | 14 | 42 |
|   |   | 7 | rbn | rbn |
| 1 | 1 | 0 | 25 | 53 |
|   |   | 1 | 24 | 52 |
|   |   | 2 | 23 | 51 |
|   |   | 3 | 22 | 50 |
|   |   | 4 | 21 | 49 |
|   |   | 5 | rbn | rbn |
|   |   | 6 | 27 | 55 |
|   |   | 7 | 26 | 54 |
| 2 | 0 | 0 | 29 | 85 |
|   |   | 1 | 28 | 84 |

Band 1

| cylinder | track | sector | MBN | LBN |
|---|---|---|---|---|
| 0 | 0 | 0 | 86 | 254 |
|   |   | 1 | 85 | 253 |
|   |   | 2 | 84 | 252 |
|   |   | 3 | rbn | rbn |
|   |   | 4 | 89 | 257 |
|   |   | 5 | 88 | 256 |
|   |   | 6 | 87 | 255 |
| 0 | 1 | 0 | rbn | rbn |
|   |   | 1 | 95 | 263 |
|   |   | 2 | 94 | 262 |
|   |   | 3 | 93 | 261 |
|   |   | 4 | 92 | 260 |
|   |   | 5 | 91 | 259 |
|   |   | 6 | 90 | 258 |
| 1 | 0 | 0 | 101 | 293 |
|   |   | 1 | 100 | 292 |
|   |   | 2 | 99 | 291 |
|   |   | 3 | 98 | 290 |
|   |   | 4 | 97 | 289 |
|   |   | 5 | 96 | 288 |
|   |   | 6 | rbn | rbn |
| 1 | 1 | 0 | 104 | 296 |
|   |   | 1 | 103 | 295 |
|   |   | 2 | 102 | 294 |
|   |   | 3 | rbn | rbn |
|   |   | 4 | 107 | 299 |
|   |   | 5 | 106 | 298 |
|   |   | 6 | 105 | 297 |
| 2 | 0 | 0 | 108 | 324 |
|   |   | 1 | rbn | rbn |
|   |   | 2 | 113 | 329 |
|   |   | 3 | 112 | 328 |
|   |   | 4 | 111 | 327 |
|   |   | 5 | 110 | 326 |

Band 2

| cylinder | track | sector | MBN | LBN |
|---|---|---|---|---|
| 0 | 0 | 0 | 138 | 414 |
|   |   | 1 | rbn | rbn |
|   |   | 2 | 142 | 418 |
|   |   | 3 | 141 | 417 |
|   |   | 4 | 140 | 416 |
|   |   | 5 | 139 | 415 |
| 0 | 1 | 0 | rbn | rbn |
|   |   | 1 | 147 | 423 |
|   |   | 2 | 146 | 422 |
|   |   | 3 | 145 | 421 |
|   |   | 4 | 144 | 420 |
|   |   | 5 | 143 | 419 |
| 1 | 0 | 0 | 152 | 448 |
|   |   | 1 | 151 | 447 |
|   |   | 2 | 150 | 446 |
|   |   | 3 | 149 | 445 |
|   |   | 4 | 148 | 444 |
|   |   | 5 | rbn | rbn |
| 1 | 1 | 0 | 153 | 449 |
|   |   | 1 | rbn | rbn |
|   |   | 2 | 157 | 453 |
|   |   | 3 | 156 | 452 |
|   |   | 4 | 155 | 451 |
|   |   | 5 | 154 | 450 |
| 2 | 0 | 0 | 167 | 483 |
|   |   | 1 | 166 | 482 |
|   |   | 2 | 165 | 481 |
|   |   | 3 | 164 | 480 |
|   |   | 4 | 159 | 475 |
|   |   | 5 | 158 | 474 |

Band 3

| cylinder | track | sector | MBN | LBN |
|---|---|---|---|---|
| 0 | 0 | 0 | 171 | 507 |
|   |   | 1 | 170 | 506 |
|   |   | 2 | 169 | 505 |
|   |   | 3 | 168 | 504 |
|   |   | 4 | rbn | rbn |
| 0 | 1 | 0 | 175 | 510 |
|   |   | 1 | 174 | 509 |
|   |   | 2 | 173 | 508 |
|   |   | 3 | 172 | — |
|   |   | 4 | rbn | rbn |
| 1 | 0 | 0 | 179 | 531 |
|   |   | 1 | 178 | 530 |
|   |   | 2 | 177 | 529 |
|   |   | 3 | 176 | 528 |
|   |   | 4 | rbn | rbn |

TABLE 2-continued

DRIVE 0

| cylinder | track | Band 0 sector | Band 0 MBN | Band 0 LBN | Band 1 cylinder | Band 1 track | Band 1 sector | Band 1 MBN | Band 1 LBN | Band 2 cylinder | Band 2 track | Band 2 sector | Band 2 MBN | Band 2 LBN | Band 3 cylinder | Band 3 track | Band 3 sector | Band 3 MBN | Band 3 LBN |
|---|---|---|---|---|---|---|---|---|---|---|---|---|---|---|---|---|---|---|---|
| 2 |   | 2 | rbn |   |   |   | 6 | 109 | 325 |   |   | 4 | 163 | 479 |   |   |   |   |   |
|   |   | 3 | 34 | 90 | 2 | 0 | 0 | 119 | 335 |   |   | 5 | rbn | rbn |   |   |   |   |   |
|   |   | 4 | 33 | 89 |   |   | 1 | 118 | 334 |   |   |   |   |   |   |   |   |   |   |
|   |   | 5 | 32 | 88 |   |   | 2 | 117 | 333 |   |   |   |   |   |   |   |   |   |   |
|   |   | 6 | 31 | 87 |   |   | 3 | 116 | 332 |   |   |   |   |   |   |   |   |   |   |
|   |   | 7 | 30 | 86 |   |   | 4 | 115 | 331 |   |   |   |   |   |   |   |   |   |   |
|   | 2 | 0 | 41 | 97 |   |   | 5 | 114 | 330 |   |   |   |   |   |   |   |   |   |   |
|   |   | 1 | 40 | 96 |   |   | 6 | rbn | rbn |   |   |   |   |   |   |   |   |   |   |
|   |   | 2 | 39 | 95 |   | 0 | 0 | 122 | 362 |   |   |   |   |   |   |   |   |   |   |
|   |   | 3 | 38 | 94 |   |   | 1 | 121 | 361 |   |   |   |   |   |   |   |   |   |   |
|   |   | 4 | 37 | 93 |   |   | 2 | 120 | 360 |   |   |   |   |   |   |   |   |   |   |
|   |   | 5 | 36 | 92 |   |   | 3 | rbn | rbn |   |   |   |   |   |   |   |   |   |   |
|   |   | 6 | 35 | 91 |   |   | 4 | 125 | 365 |   |   |   |   |   |   |   |   |   |   |
|   |   | 7 | rbn | rbn |   |   | 5 | 124 | 364 |   |   |   |   |   |   |   |   |   |   |
|   | 0 | 0 | 46 | 130 |   |   | 6 | 123 | 363 |   |   |   |   |   |   |   |   |   |   |
|   |   | 1 | 45 | 129 |   | 1 | 0 | 126 | 366 |   |   |   |   |   |   |   |   |   |   |
|   |   | 2 | 44 | 128 |   |   | 1 | rbn | rbn |   |   |   |   |   |   |   |   |   |   |
|   |   | 3 | 43 | 127 |   |   | 2 | 131 | 371 |   |   |   |   |   |   |   |   |   |   |
|   |   | 4 | 42 | 126 |   |   | 3 | 130 | 370 |   |   |   |   |   |   |   |   |   |   |
|   |   | 5 | rbn | rbn |   |   | 4 | 129 | 369 |   |   |   |   |   |   |   |   |   |   |
|   |   | 6 | 48 | 132 |   |   | 5 | 128 | 368 |   |   |   |   |   |   |   |   |   |   |
|   |   | 7 | 47 | 131 |   |   | 6 | 127 | 367 |   |   |   |   |   |   |   |   |   |   |
|   | 1 | 0 | 50 | 134 |   | 2 | 0 | 137 | 401 |   |   |   |   |   |   |   |   |   |   |
|   |   | 1 | 49 | 133 |   |   | 1 | 136 | 400 |   |   |   |   |   |   |   |   |   |   |
|   |   | 2 | rbn | rbn |   |   | 2 | 135 | 399 |   |   |   |   |   |   |   |   |   |   |
|   |   | 3 | 55 | 139 |   |   | 3 | 134 | 398 |   |   |   |   |   |   |   |   |   |   |
|   |   | 4 | 54 | 138 |   |   | 4 | 133 | 397 |   |   |   |   |   |   |   |   |   |   |
|   |   | 5 | 53 | 137 |   |   | 5 | 132 | 396 |   |   |   |   |   |   |   |   |   |   |
|   |   | 6 | 52 | 136 |   |   | 6 | rbn | rbn |   |   |   |   |   |   |   |   |   |   |
|   |   | 7 | 51 | 135 |   |   |   |   |   |   |   |   |   |   |   |   |   |   |   |
|   | 2 | 0 | 62 | 174 |   |   |   |   |   |   |   |   |   |   |   |   |   |   |   |
|   |   | 1 | 61 | 173 |   |   |   |   |   |   |   |   |   |   |   |   |   |   |   |
|   |   | 2 | 60 | 172 |   |   |   |   |   |   |   |   |   |   |   |   |   |   |   |
|   |   | 3 | 59 | 171 |   |   |   |   |   |   |   |   |   |   |   |   |   |   |   |
|   |   | 4 | 58 | 170 |   |   |   |   |   |   |   |   |   |   |   |   |   |   |   |
|   |   | 5 | 57 | 6 |   |   |   |   |   |   |   |   |   |   |   |   |   |   |   |
|   |   | 6 | 56 | 168 |   |   |   |   |   |   |   |   |   |   |   |   |   |   |   |
|   |   | 7 | rbn | rbn |   |   |   |   |   |   |   |   |   |   |   |   |   |   |   |
| 3 | 0 | 0 | 67 | 179 |   |   |   |   |   |   |   |   |   |   |   |   |   |   |   |

TABLE 2-continued

DRIVE 0

| cylinder | track | sector | Band 0 MBN | LBN | cylinder | track | sector | Band 1 MBN | LBN | cylinder | track | sector | Band 2 MBN | LBN | cylinder | track | sector | Band 3 MBN | LBN |
|---|---|---|---|---|---|---|---|---|---|---|---|---|---|---|---|---|---|---|---|
|  |  | 1 | 66 | 178 |  |  |  |  |  |  |  |  |  |  |  |  |  |  |  |
|  |  | 2 | 65 | 177 |  |  |  |  |  |  |  |  |  |  |  |  |  |  |  |
|  |  | 3 | 64 | 176 |  |  |  |  |  |  |  |  |  |  |  |  |  |  |  |
|  |  | 4 | 63 | 175 |  |  |  |  |  |  |  |  |  |  |  |  |  |  |  |
|  |  | 5 | rbn | rbn |  |  |  |  |  |  |  |  |  |  |  |  |  |  |  |
|  |  | 6 | 69 | 181 |  |  |  |  |  |  |  |  |  |  |  |  |  |  |  |
|  |  | 7 | 68 | 180 |  |  |  |  |  |  |  |  |  |  |  |  |  |  |  |
|  | 1 | 0 | 71 | 211 |  |  |  |  |  |  |  |  |  |  |  |  |  |  |  |
|  |  | 1 | 70 | 210 |  |  |  |  |  |  |  |  |  |  |  |  |  |  |  |
|  |  | 2 | rbn | rbn |  |  |  |  |  |  |  |  |  |  |  |  |  |  |  |
|  |  | 3 | 76 | 216 |  |  |  |  |  |  |  |  |  |  |  |  |  |  |  |
|  |  | 4 | 75 | 215 |  |  |  |  |  |  |  |  |  |  |  |  |  |  |  |
|  |  | 5 | 74 | 214 |  |  |  |  |  |  |  |  |  |  |  |  |  |  |  |
|  |  | 6 | 73 | 213 |  |  |  |  |  |  |  |  |  |  |  |  |  |  |  |
|  |  | 7 | 72 | 212 |  |  |  |  |  |  |  |  |  |  |  |  |  |  |  |
|  | 2 | 0 | 83 | 223 |  |  |  |  |  |  |  |  |  |  |  |  |  |  |  |
|  |  | 1 | 82 | 222 |  |  |  |  |  |  |  |  |  |  |  |  |  |  |  |
|  |  | 2 | 81 | 221 |  |  |  |  |  |  |  |  |  |  |  |  |  |  |  |
|  |  | 3 | 80 | 220 |  |  |  |  |  |  |  |  |  |  |  |  |  |  |  |
|  |  | 4 | 79 | 219 |  |  |  |  |  |  |  |  |  |  |  |  |  |  |  |
|  |  | 5 | 78 | 218 |  |  |  |  |  |  |  |  |  |  |  |  |  |  |  |
|  |  | 6 | 77 | 217 |  |  |  |  |  |  |  |  |  |  |  |  |  |  |  |
|  |  | 7 | rbn | rbn |  |  |  |  |  |  |  |  |  |  |  |  |  |  |  |

DRIVE 1

| Band 0 | | | | | Band 1 | | | | | Band 2 | | | | | Band 3 | | | | |
|---|---|---|---|---|---|---|---|---|---|---|---|---|---|---|---|---|---|---|---|
| cylinder | track | sector | MBN | LBN | cylinder | track | sector | MBN | LBN | cylinder | track | sector | MBN | LBN | cylinder | track | sector | MBN | LBN |
| 0 | 0 | 0 | 4 | 18 | 0 | 0 | 0 | 86 | 266 | 0 | 0 | 0 | 138 | 424 | 0 | 0 | 0 | 171 | 515 |
|   |   | 1 | 3 | 17 |   |   | 1 | 85 | 265 |   |   | 1 | rbm | rbm |   |   | 1 | 170 | 514 |
|   |   | 2 | 2 | 16 |   |   | 2 | 84 | 264 |   |   | 2 | 142 | 428 |   |   | 2 | 169 | 513 |
|   |   | 3 | 1 | 15 |   |   | 3 | rbm | rbm |   |   | 3 | 141 | 427 |   |   | 3 | 168 | 512 |
|   |   | 4 | 0 | 14 |   |   | 4 | 89 | 269 |   |   | 4 | 140 | 426 |   |   | 4 | rbm | rbm |
|   |   | 5 | rbm | rbm |   |   | 5 | 88 | 268 |   |   | 5 | 139 | 425 |   | 1 | 0 | 175 | 519 |
|   |   | 6 | 6 | 20 |   |   | 6 | 87 | 267 |   | 1 | 0 | rbm | rbm |   |   | 1 | 174 | 518 |
|   |   | 7 | 5 | 19 |   | 1 | 0 | 90 | 270 |   |   | 1 | 147 | 433 |   |   | 2 | 173 | 517 |
|   | 1 | 0 | 8 | 22 |   |   | 1 | rbm | rbm |   |   | 2 | 146 | 432 |   |   | 3 | 172 | 516 |
|   |   | 1 | 7 | 21 |   |   | 2 | 95 | 275 |   |   | 3 | 145 | 431 |   |   | 4 | rbm | rbm |
|   |   | 2 | rbm | rbm |   |   | 3 | 94 | 274 |   |   | 4 | 144 | 430 |   | 2 | 0 | 179 | 535 |
|   |   | 3 | 13 | 27 |   |   | 4 | 93 | 273 |   |   | 5 | 143 | 429 |   |   | 1 | 178 | 534 |
|   |   | 4 | 12 | 26 |   |   | 5 | 92 | 272 |   | 2 | 0 | 152 | 458 |   |   | 2 | 177 | 533 |
|   |   | 5 | 11 | 25 |   |   | 6 | 91 | 271 |   |   | 1 | 151 | 457 |   |   | 3 | 176 | 532 |
|   |   | 6 | 10 | 24 |   | 2 | 0 | 101 | 305 |   |   | 2 | 150 | 456 |   |   | 4 | rbm | rbm |
|   |   | 7 | 9 | 23 |   |   | 1 | 100 | 304 |   |   | 3 | 149 | 455 |   |   |   |   |   |
|   | 2 | 0 | 20 | 62 |   |   | 2 | 99 | 303 |   |   | 4 | 148 | 454 |   |   |   |   |   |
|   |   | 1 | 19 | 61 |   |   | 3 | 98 | 302 |   |   | 5 | rbm | rbm |   |   |   |   |   |
|   |   | 2 | 18 | 60 |   |   | 4 | 97 | 301 |   | 3 | 0 | 153 | 459 |   |   |   |   |   |
|   |   | 3 | 17 | 59 |   |   | 5 | 96 | 300 |   |   | 1 | rbm | rbm |   |   |   |   |   |
|   |   | 4 | 16 | 58 |   |   | 6 | rbm | rbm |   |   | 2 | 157 | 463 |   |   |   |   |   |
|   |   | 5 | 15 | 57 | 1 | 0 | 0 | 104 | 308 |   |   | 3 | 156 | 462 |   |   |   |   |   |
|   |   | 6 | 14 | 56 |   |   | 1 | 103 | 307 |   |   | 4 | 155 | 461 |   |   |   |   |   |
|   |   | 7 | rbm | rbm |   |   | 2 | 102 | 306 |   |   | 5 | 154 | 460 |   |   |   |   |   |
| 1 | 0 | 0 | 25 | 67 |   |   | 3 | rbm | rbm |   | 4 | 0 | rbm | rbm |   |   |   |   |   |
|   |   | 1 | 24 | 66 |   |   | 4 | 107 | 311 |   |   | 1 | 162 | 488 |   |   |   |   |   |
|   |   | 2 | 23 | 65 |   |   | 5 | 106 | 310 |   |   | 2 | 161 | 487 |   |   |   |   |   |
|   |   | 3 | 22 | 64 |   |   | 6 | 105 | 309 |   |   | 3 | 160 | 486 |   |   |   |   |   |
|   |   | 4 | 21 | 63 |   | 1 | 0 | 108 | 336 |   |   | 4 | 159 | 485 |   |   |   |   |   |
|   |   | 5 | rbm | rbm |   |   | 1 | rbm | rbm |   |   | 5 | 158 | 484 |   |   |   |   |   |
|   |   | 6 | 27 | 69 |   |   | 2 | 113 | 341 |   | 5 | 0 | 167 | 493 |   |   |   |   |   |
|   |   | 7 | 26 | 68 |   |   | 3 | 112 | 340 |   |   | 1 | 166 | 492 |   |   |   |   |   |
|   | 1 | 0 | 29 | 99 |   |   | 4 | 111 | 339 |   |   | 2 | 165 | 491 |   |   |   |   |   |
|   |   | 1 | 28 | 98 |   |   | 5 | 110 | 338 |   |   | 3 | 164 | 490 |   |   |   |   |   |

-continued
DRIVE 1

| cylinder | track | Band 0 sector | MBN | LBN | cylinder | track | Band 1 sector | MBN | LBN | cylinder | track | Band 2 sector | MBN | LBN | cylinder | track | Band 3 sector | MBN | LBN |
|---|---|---|---|---|---|---|---|---|---|---|---|---|---|---|---|---|---|---|---|
| | | 2 | rbn | rbn | | | 6 | 109 | 337 | | | 4 | 163 | 489 | | | | | |
| | | 3 | 34 | 104 | | | 0 | 119 | 347 | | | 5 | rbn | rbn | | | | | |
| | | 4 | 33 | 109 | | | 1 | 118 | 346 | | | | | | | | | | |
| | | 5 | 32 | 102 | | | 1 | 118 | 345 | | | | | | | | | | |
| | | 6 | 31 | 101 | | | 3 | 116 | 344 | | | | | | | | | | |
| | | 7 | 30 | 100 | | | 4 | 115 | 343 | | | | | | | | | | |
| | 2 | 0 | 41 | 111 | | | 5 | 114 | 342 | | | | | | | | | | |
| | | 1 | 40 | 110 | 2 | | 6 | rbn | rbn | | | | | | | | | | |
| | | 2 | 39 | 109 | | 0 | 0 | 122 | 374 | | | | | | | | | | |
| | | 3 | 38 | 108 | | | 1 | 121 | 373 | | | | | | | | | | |
| | | 4 | 37 | 107 | | | 2 | 120 | 372 | | | | | | | | | | |
| | | 5 | 36 | 106 | | | 3 | rbn | rbn | | | | | | | | | | |
| | | 6 | 35 | 105 | | | 4 | 125 | 377 | | | | | | | | | | |
| | | 7 | rbn | rbn | | | 5 | 124 | 376 | | | | | | | | | | |
| 2 | 0 | 0 | 46 | 144 | | 1 | 6 | 123 | 375 | | | | | | | | | | |
| | | 1 | 45 | 143 | | | 0 | 126 | 378 | | | | | | | | | | |
| | | 2 | 44 | 142 | | | 1 | rbn | rbn | | | | | | | | | | |
| | | 3 | 43 | 141 | | | 2 | 131 | 383 | | | | | | | | | | |
| | | 4 | 42 | 140 | | | 3 | 130 | 382 | | | | | | | | | | |
| | | 5 | rbn | rbn | | | 4 | 129 | 381 | | | | | | | | | | |
| | | 6 | 48 | 146 | | | 5 | 128 | 380 | | | | | | | | | | |
| | | 7 | 47 | 145 | | | 6 | 127 | 379 | | | | | | | | | | |
| | 1 | 0 | 50 | 148 | | 2 | 0 | 137 | 407 | | | | | | | | | | |
| | | 1 | 49 | 147 | | | 1 | 136 | 406 | | | | | | | | | | |
| | | 2 | rbn | rbn | | | 2 | 135 | 405 | | | | | | | | | | |
| | | 3 | 55 | 153 | | | 3 | 134 | 404 | | | | | | | | | | |
| | | 4 | 54 | 152 | | | 4 | 133 | 403 | | | | | | | | | | |
| | | 5 | 53 | 151 | | | 5 | 132 | 402 | | | | | | | | | | |
| | | 6 | 52 | 150 | | | 6 | rbn | rbn | | | | | | | | | | |
| | | 7 | 51 | 149 | | | | | | | | | | | | | | | |
| | 2 | 0 | 62 | 188 | | | | | | | | | | | | | | | |
| | | 1 | 61 | 187 | | | | | | | | | | | | | | | |
| | | 2 | 60 | 186 | | | | | | | | | | | | | | | |
| | | 3 | 59 | 185 | | | | | | | | | | | | | | | |
| | | 4 | 58 | 184 | | | | | | | | | | | | | | | |
| | | 5 | 57 | 183 | | | | | | | | | | | | | | | |
| | | 6 | 56 | 182 | | | | | | | | | | | | | | | |
| | | 7 | rbn | rbn | | | | | | | | | | | | | | | |
| 3 | 0 | 0 | 67 | 193 | | | | | | | | | | | | | | | |

-continued

DRIVE 1

| | | Band 0 | | | | | Band 1 | | | | | Band 2 | | | | | Band 3 | | |
|---|---|---|---|---|---|---|---|---|---|---|---|---|---|---|---|---|---|---|---|
| cylinder | track | sector | MBN | LBN | cylinder | track | sector | MBN | LBN | cylinder | track | sector | MBN | LBN | cylinder | track | sector | MBN | LBN |
| | | 1 | 66 | 192 | | | | | | | | | | | | | | | |
| | | 2 | 65 | 191 | | | | | | | | | | | | | | | |
| | | 3 | 64 | 190 | | | | | | | | | | | | | | | |
| | | 4 | 63 | 189 | | | | | | | | | | | | | | | |
| | | 5 | rbn | rbn | | | | | | | | | | | | | | | |
| | | 6 | 69 | 195 | | | | | | | | | | | | | | | |
| | | 7 | 68 | 194 | | | | | | | | | | | | | | | |
| | 1 | 0 | 71 | 225 | | | | | | | | | | | | | | | |
| | | 1 | 70 | 224 | | | | | | | | | | | | | | | |
| | | 2 | rbn | rbn | | | | | | | | | | | | | | | |
| | | 3 | 76 | 230 | | | | | | | | | | | | | | | |
| | | 4 | 75 | 229 | | | | | | | | | | | | | | | |
| | | 5 | 74 | 228 | | | | | | | | | | | | | | | |
| | | 6 | 73 | 227 | | | | | | | | | | | | | | | |
| | | 7 | 72 | 226 | | | | | | | | | | | | | | | |
| | 2 | 0 | 83 | 237 | | | | | | | | | | | | | | | |
| | | 1 | 82 | 236 | | | | | | | | | | | | | | | |
| | | 2 | 81 | 235 | | | | | | | | | | | | | | | |
| | | 3 | 80 | 234 | | | | | | | | | | | | | | | |
| | | 4 | 79 | 233 | | | | | | | | | | | | | | | |
| | | 5 | 78 | 232 | | | | | | | | | | | | | | | |
| | | 6 | 77 | 231 | | | | | | | | | | | | | | | |
| | | 7 | rbn | rbn | | | | | | | | | | | | | | | |

DRIVE 2

| cylinder | track | Band 0 sector | MBN | LBN | cylinder | track | Band 1 sector | MBN | LBN | cylinder | track | Band 2 sector | MBN | LBN | cylinder | track | Band 3 sector | MBN | LBN |
|---|---|---|---|---|---|---|---|---|---|---|---|---|---|---|---|---|---|---|---|
| 0 | 0 | 0 | 4 | 32 | 0 | 0 | 0 | 86 | 278 | 0 | 0 | 0 | 138 | 434 | 0 | 0 | 0 | 171 | 523 |
|  |  | 1 | 3 | 31 |  |  | 1 | 85 | 277 |  |  | 1 | rbn | rbn |  |  | 1 | 170 | 522 |
|  |  | 2 | 2 | 30 |  |  | 2 | 84 | 276 |  |  | 2 | 142 | 438 |  |  | 2 | 169 | 521 |
|  |  | 3 | 1 | 29 |  |  | 3 | rbn | rbn |  |  | 3 | 141 | 437 |  |  | 3 | 168 | 520 |
|  |  | 4 | 0 | 28 |  |  | 4 | 89 | 281 |  |  | 4 | 140 | 436 |  |  | 4 | rbn | rbn |
|  |  | 5 | rbn | rbn |  |  | 5 | 88 | 280 |  |  | 5 | 138 | 435 |  |  |  |  |  |
|  |  | 6 | 6 | 34 |  |  | 6 | 87 | 279 |  |  |  |  |  |  |  | 0 | 175 | 527 |
|  |  | 7 | 5 | 33 |  | 1 | 0 | 90 | 282 |  | 1 | 0 | rbn | rbn |  | 1 | 1 | 174 | 525 |
|  | 1 | 0 | 8 | 36 |  |  | 1 | rbn | rbn |  |  | 1 | 147 | 443 |  |  | 2 | 173 | 525 |
|  |  | 1 | 7 | 35 |  |  | 2 | 95 | 287 |  |  | 2 | 146 | 442 |  |  | 3 | 172 | 524 |
|  |  | 2 | rbn | rbn |  |  | 3 | 94 | 286 |  |  | 3 | 145 | 441 |  |  | 4 | rbn | rbn |
|  |  | 3 | 13 | 41 |  |  | 4 | 93 | 285 |  |  | 4 | 144 | 440 |  | 2 | 0 | 179 | 539 |
|  |  | 4 | 12 | 40 |  |  | 5 | 92 | 284 |  |  | 5 | 143 | 439 |  |  | 1 | 178 | 538 |
|  |  | 5 | 11 | 39 |  |  | 6 | 91 | 283 |  | 2 | 0 | 152 | 468 |  |  | 2 | 177 | 537 |
|  |  | 6 | 10 | 38 |  | 2 | 0 | 101 | 317 |  |  | 1 | 151 | 467 |  |  | 3 | 176 | 536 |
|  |  | 7 | 9 | 37 |  |  | 1 | 100 | 316 |  |  | 2 | 150 | 466 |  |  | 4 | rbn | rbn |
| 1 | 0 | 0 | 20 | 76 |  |  | 2 | 99 | 315 |  |  | 3 | 149 | 465 |  |  |  |  |  |
|  |  | 1 | 19 | 75 |  |  | 3 | 98 | 314 |  |  | 4 | 148 | 464 |  |  |  |  |  |
|  |  | 2 | 18 | 74 |  |  | 4 | 97 | 313 |  |  | 5 | rbn | rbn |  |  |  |  |  |
|  |  | 3 | 17 | 73 |  |  | 5 | 96 | 312 | 1 | 0 | 0 | 153 | 469 |  |  |  |  |  |
|  |  | 4 | 16 | 72 |  |  | 6 | rbn | rbn |  |  | 1 | rbn | rbn |  |  |  |  |  |
|  |  | 5 | 15 | 71 |  |  | 0 | 104 | 320 |  |  | 2 | 157 | 473 |  |  |  |  |  |
|  |  | 6 | 14 | 70 |  |  | 1 | 103 | 319 |  |  | 3 | 156 | 472 |  |  |  |  |  |
|  |  | 7 | rbn | rbn |  |  | 2 | 102 | 318 |  |  | 4 | 155 | 471 |  |  |  |  |  |
|  | 1 | 0 | 25 | 81 |  |  | 3 | rbn | rbn |  |  | 5 | 154 | 470 |  |  |  |  |  |
|  |  | 1 | 24 | 80 |  |  | 4 | 107 | 323 |  | 1 | 0 | rbn | rbn |  |  |  |  |  |
|  |  | 2 | 23 | 79 |  |  | 5 | 106 | 322 |  |  | 1 | 162 | 498 |  |  |  |  |  |
|  |  | 3 | 22 | 78 |  |  | 6 | 105 | 321 |  |  | 2 | 161 | 497 |  |  |  |  |  |
|  |  | 4 | 21 | 77 |  |  | 0 | 108 | 348 |  |  | 3 | 160 | 496 |  |  |  |  |  |
|  |  | 5 | rbn | rbn |  |  | 1 | rbn | rbn |  |  | 4 | 159 | 495 |  |  |  |  |  |
|  |  | 6 | 27 | 83 |  |  | 2 | 113 | 353 |  |  | 5 | 158 | 494 |  |  |  |  |  |
|  |  | 7 | 26 | 82 |  |  | 3 | 112 | 352 |  | 2 | 0 | 167 | 503 |  |  |  |  |  |
| 2 | 0 | 0 | 29 | 113 |  |  | 4 | 111 | 351 |  |  | 1 | 166 | 502 |  |  |  |  |  |
|  |  | 1 | 28 | 112 |  |  | 5 | 110 | 350 |  |  | 2 | 165 | 501 |  |  |  |  |  |
|  |  |  |  |  |  |  |  |  |  |  |  | 3 | 164 | 500 |  |  |  |  |  |

-continued

DRIVE 2

| Band 0 | | | | Band 1 | | | | Band 2 | | | | Band 3 | | | | |
|---|---|---|---|---|---|---|---|---|---|---|---|---|---|---|---|---|
| cylinder | track | sector | MBN | LBN | cylinder | track | sector | MBN | LBN | cylinder | track | sector | MBN | LBN | cylinder | track | sector | MBN | LBN |
| | | 2 | rbn | rbn | | | 6 | 109 | 349 | | | 4 | 163 | 499 | | | | | |
| | | 3 | 34 | 118 | | | 0 | 119 | 359 | | | 5 | rbn | rbn | | | | | |
| | | 4 | 33 | 117 | | | 1 | 118 | 358 | | | | | | | | | | |
| | | 5 | 32 | 116 | | | 2 | 118 | 357 | | | | | | | | | | |
| | | 6 | 31 | 115 | | | 3 | 116 | 356 | | | | | | | | | | |
| | | 7 | 30 | 114 | | | 4 | 115 | 355 | | | | | | | | | | |
| 2 | 0 | 0 | 41 | 125 | | | 5 | 114 | 354 | | | | | | | | | | |
| | | 1 | 40 | 124 | | | 6 | rbn | rbn | | | | | | | | | | |
| | | 2 | 39 | 123 | | 0 | 0 | 122 | 386 | | | | | | | | | | |
| | | 3 | 38 | 122 | | | 1 | 121 | 385 | | | | | | | | | | |
| | | 4 | 37 | 121 | | | 2 | 120 | 384 | | | | | | | | | | |
| | | 5 | 36 | 120 | | | 3 | rbn | rbn | | | | | | | | | | |
| | | 6 | 35 | 119 | | | 4 | 125 | 389 | | | | | | | | | | |
| | | 7 | rbn | rbn | | | 5 | 124 | 388 | | | | | | | | | | |
| 2 | 0 | 0 | 46 | 158 | | | 6 | 123 | 387 | | | | | | | | | | |
| | | 1 | 45 | 157 | | 1 | 0 | 126 | 390 | | | | | | | | | | |
| | | 2 | 44 | 156 | | | 1 | rbn | rbn | | | | | | | | | | |
| | | 3 | 43 | 155 | | | 2 | 131 | 395 | | | | | | | | | | |
| | | 4 | 42 | 154 | | | 3 | 130 | 394 | | | | | | | | | | |
| | | 5 | rbn | rbn | | | 4 | 129 | 393 | | | | | | | | | | |
| | | 6 | 48 | 160 | | | 5 | 128 | 392 | | | | | | | | | | |
| | | 7 | 47 | 159 | | | 6 | 127 | 391 | | | | | | | | | | |
| | 1 | 0 | 50 | 162 | | 2 | 0 | 137 | 413 | | | | | | | | | | |
| | | 1 | 49 | 161 | | | 1 | 136 | 412 | | | | | | | | | | |
| | | 2 | rbn | rbn | | | 2 | 135 | 411 | | | | | | | | | | |
| | | 3 | 55 | 167 | | | 3 | 134 | 410 | | | | | | | | | | |
| | | 4 | 54 | 166 | | | 4 | 133 | 409 | | | | | | | | | | |
| | | 5 | 53 | 165 | | | 5 | 132 | 408 | | | | | | | | | | |
| | | 6 | 52 | 164 | | | 6 | rbn | rbn | | | | | | | | | | |
| | | 7 | 51 | 163 | | | | | | | | | | | | | | | | |
| | 2 | 0 | 62 | 202 | | | | | | | | | | | | | | | | |
| | | 1 | 61 | 201 | | | | | | | | | | | | | | | | |
| | | 2 | 60 | 200 | | | | | | | | | | | | | | | | |
| | | 3 | 59 | 199 | | | | | | | | | | | | | | | | |
| | | 4 | 58 | 198 | | | | | | | | | | | | | | | | |
| | | 5 | 57 | 197 | | | | | | | | | | | | | | | | |
| | | 6 | 56 | 196 | | | | | | | | | | | | | | | | |
| | | 7 | rbn | rbn | | | | | | | | | | | | | | | | |
| 3 | 0 | 0 | 67 | 207 | | | | | | | | | | | | | | | | |

-continued

DRIVE 2

| cylinder | track | sector | Band 0 MBN | LBN | cylinder | track | sector | Band 1 MBN | LBN | cylinder | track | sector | Band 2 MBN | LBN | cylinder | track | sector | Band 3 MBN | LBN |
|---|---|---|---|---|---|---|---|---|---|---|---|---|---|---|---|---|---|---|---|
| | | 1 | 66 | 206 | | | | | | | | | | | | | | | |
| | | 2 | 65 | 205 | | | | | | | | | | | | | | | |
| | | 3 | 64 | 204 | | | | | | | | | | | | | | | |
| | | 4 | 63 | 203 | | | | | | | | | | | | | | | |
| | | 5 | rbn | rbn | | | | | | | | | | | | | | | |
| | | 6 | 69 | 209 | | | | | | | | | | | | | | | |
| | | 7 | 68 | 208 | | | | | | | | | | | | | | | |
| | 1 | 0 | 71 | 239 | | | | | | | | | | | | | | | |
| | | 1 | 70 | 238 | | | | | | | | | | | | | | | |
| | | 2 | rbn | rbn | | | | | | | | | | | | | | | |
| | | 3 | 76 | 244 | | | | | | | | | | | | | | | |
| | | 4 | 75 | 243 | | | | | | | | | | | | | | | |
| | | 5 | 74 | 242 | | | | | | | | | | | | | | | |
| | | 6 | 73 | 241 | | | | | | | | | | | | | | | |
| | | 7 | 72 | 240 | | | | | | | | | | | | | | | |
| | 2 | 0 | 83 | 251 | | | | | | | | | | | | | | | |
| | | 1 | 82 | 250 | | | | | | | | | | | | | | | |
| | | 2 | 81 | 249 | | | | | | | | | | | | | | | |
| | | 3 | 80 | 248 | | | | | | | | | | | | | | | |
| | | 4 | 79 | 247 | | | | | | | | | | | | | | | |
| | | 5 | 78 | 246 | | | | | | | | | | | | | | | |
| | | 6 | 77 | 245 | | | | | | | | | | | | | | | |
| | | 7 | rbn | rbn | | | | | | | | | | | | | | | |

What is claimed is:

1. A method of arranging logical data blocks in physical block locations in a disc drive type storage unit having a plurality of discs, each of said discs having a top and bottom surface, each of said disc surfaces having a plurality of bands, each band having a plurality of tracks and each track having a plurality of sectors, and each said disc drive having a plurality of heads, each head associated with a top or bottom surface of one of said plurality of discs, and each of said tracks on each of said surfaces associated with each of said heads forming a cylinder, said method comprising the steps of:

determining parameters of said disc storage unit, said parameters comprising at least the number and order of said sectors in each of said tracks for each of said cylinders in said disc drive and the number and order of said tracks in each of said cylinders; and assigning logical block numbers to said disc drive in the reverse order of said tracks and sectors in said cylinders so that said logical block numbers for said top and bottom surfaces of each of said discs pass under said associated head in decreasing order from one of said heads to the next.

2. A method of arranging logical data blocks in physical block locations in a plurality of disc drive type storage units, each of said disc drive type storage units having a plurality of bands, each of said discs having a top and bottom surface, each of said disc surfaces having a plurality of bands, each band having a plurality of tracks and each track having a plurality of sectors, and each said disc drive having a plurality of heads, each head associated with a top or bottom surface of one of said plurality of discs, and each of said tracks on each of said surfaces associated with each of said heads forming a cylinder, said method comprising the steps of:

determining parameters of each said disc drive storage unit said parameters comprising at least the number and order of said sectors in each of said tracks for each of said cylinders in each said disc drive and the number and order of said tracks in each of said cylinders; and assigning logical block numbers to each said disc drive in the reverse order of said tracks and sectors in said cylinders so that said logical block numbers for said top and bottom surfaces of each of said discs pass under said associated head in decreasing order from one of said heads to the next.

3. The method recited in claim 2, wherein said step of determining parameters of each said disc drive storage unit further comprises determining the number and order of said plurality of disc drives, the number and order of said bands on each of said disc drives and the number and order of said cylinders for each of said bands.

4. The method recited in claim 3, wherein said step of assigning said logical numbers further comprises assigning said logical block numbers to all of said disc drives in the reverse order of said disc drives and bands.

5. The method recited in claim 4, further comprising the step of: assigning a sequential media block number to each of said plurality of disc drives in reverse order to said bands, cylinders, tracks and sectors of each of said disc drives.

6. The method recited in claim 5, wherein said steps of assigning said logical block numbers and media block numbers each further comprise the step of offsetting the placement of said logical block numbers and media block numbers between said tracks in each of said cylinders by a sector offset corresponding to the number of said sectors passed during a head switching operation between said tracks in each of said cylinders.

7. The method recited in claim 6, wherein said steps of offsetting said logical block numbers and media block numbers each comprise offsetting said logical block numbers and media block numbers by said sector offset in the reverse order of said sectors.

8. The method recited in claim 7, wherein said step of assigning said media block numbers further assigning said media block numbers beginning from the top track of the outermost of said cylinders of the outermost of said bands and continuing to the bottom track of the innermost of said cylinders of the innermost of said bands.

9. The methods recited in claim 8, wherein said step of assigning said logical block numbers further comprises assigning said logical block numbers beginning from the top track in the outermost of said cylinders of the outermost of said bands in the last of said plurality of disc drives and continuing of the bottom track in the innermost of said cylinders of the innermost of said bands in the last of said plurality of disc drives.

10. A method of arranging logical data blocks in physical block locations in a set of disc drive type storage units, each disc drive having a plurality of discs, each of said discs having a top and bottom surface, each of said disc surfaces having a plurality of bands, each band having a plurality of tracks and each track having a plurality of sectors, and each said disc drive having a plurality of heads, each head associated with a top or bottom surface of one of said plurality of discs, and each of said tracks on each of said surfaces associated with each of said heads forming a cylinder, said method comprising the steps of:

determining parameters of said disc drive storage units, said parameters comprising the number and order of said disc drives, the number and order of said bands on each of said disc drives, the number and order of said cylinders for each of said bands, the number and order of said sectors in each of said tracks for each of said bands and the number and order of said tracks in each of said cylinders; and assigning logical block numbers to all of said disc drives in the reverse order of said disc drives, bands, cylinders, tracks and sectors so that said logical block numbers for said top and bottom surfaces of each of said discs pass under said associated head in decreasing order from one of said heads to the next.

11. The method recited in claim 10, wherein said step of determining parameters further comprises determining the number of tracks per stripe in said set of disc drives, and further comprising the steps of:

assigning a full stripe boundary to each of said bands in each of said disc drives by determining the number of chunks defined in logical data blocks that are evenly divisible into the number of logical blocks in each of said bands; and assigning a short strip boundary as the portion of each of said bands remaining after said full stripe boundary, when said chunk defined in logical blocks does not evenly divide into the number logical blocks in each of said band.

12. The method recited in claim 11, further comprising the step of: assigning sequential media block numbers to each of said disc drives in said set of disc drives in reverse order of said bands, cylinders, tracks and sectors of each of said disc drives so that said logical block numbers for said top and bottom surfaces of each of said discs pass under said associated head in decreasing order from one of said heads to the next.

13. The method recited in claim 12, wherein said steps of assigning logical block numbers and media block numbers each further comprise the step of offsetting the placement of said logical block numbers and said media block numbers between said tracks in each of said cylinders by a sector offset corresponding to the number of said sectors passed during a head switching operation between said tracks in each of said cylinders.

14. The method recited in claim 13, wherein said steps of offsetting said logical block numbers and media block numbers each comprise offsetting said logical block numbers and media block numbers by said sector offset in the reverse order of said sectors.

15. A method of arranging logical data blocks in physical block locations in a striped set of disc drive type storage units so that all of said disc drives are presented as a single logical volume for input/output requests, said logical data blocks are arranged into chunks, each of said disc drives having a plurality of discs, each of said discs having a top and bottom surface, each of said disc surfaces having a plurality of bands, each band having a plurality of tracks and each track having a plurality of sectors, and each said disc drive having a plurality of heads, each head associated with a top or bottom surface of one of said plurality of discs, and each of said tracks on each of said surfaces associated with each of said heads, forming a cylinder, said method comprising the steps of:

determining parameters of said disc drive storage units, said parameters comprising the number and order of said disc drives, the number and order of said hands on each of said disc drives, the number and order of said cylinders for each of said bands, the number and order of said tracks for each of said cylinders, the number and order of said sectors for each of said tracks in each of said bands and the number of said tracks for each stripe;

assigning a full stripe boundary to each of said bands in each of said disc drives by determining the number of chunks defined in logical data blocks that are evenly divisible into the number of logical blocks in each of said bands;

assigning a short stripe boundary as the portion of each of said bands remaining after said full stripe boundary, when said chunk defined in logical blocks does not evenly divide into the number of logic blocks in each said band; and assigning logical block numbers to all of said disc drives in the reverse order of said sectors and tracks in said assigned strips in said striped set of disc drives from the top track of the outermost of said cylinders of the innermost of said bands to the bottom track of the innermost of said cylinders of the outermost of said bands with a sector offset between said tracks in each of said cylinders, said sector offset corresponding to the number of said sectors passed during a head switch operation between said tracks in each of said cylinders.

16. The method recited in claim 15, further comprising the step of: assigning sequential media block numbers to each of said disc drives in said set of disc drives in reverse order of said sectors and tracks in said cylinders for each of said bands from the top track of the outermost of said cylinders of the innermost of said bands to the bottom track of the innermost of said cylinders of the outermost of said bands with said sector offset between said tracks in each of said cylinders.

* * * * *